A. B. STARR.
APPARATUS FOR MANUFACTURING CEMENT BOARDS.
APPLICATION FILED JAN. 25, 1915.
1,204,083.
Patented Nov. 7, 1916.
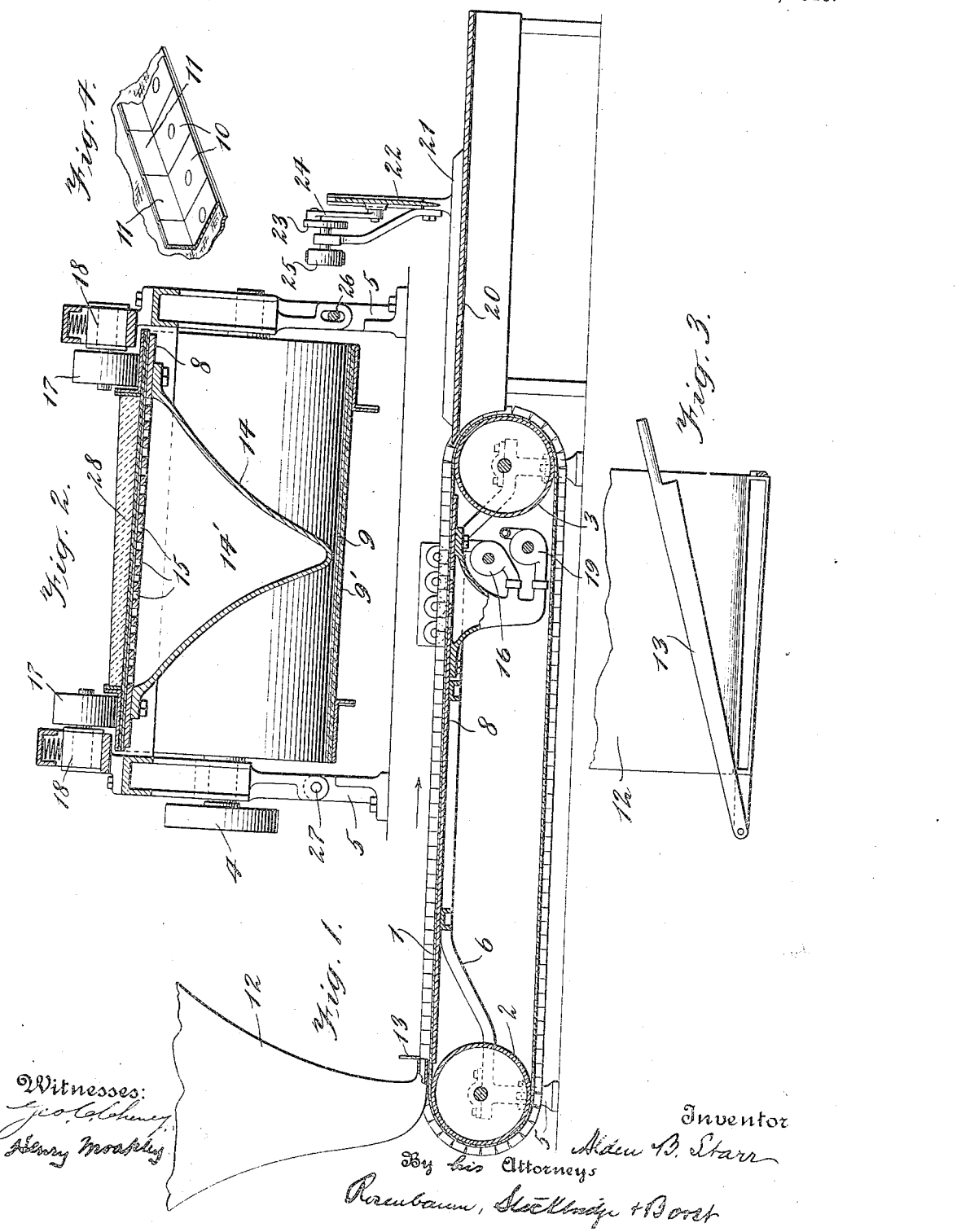

UNITED STATES PATENT OFFICE.

ALDEN B. STARR, OF NEW YORK, N. Y.

APPARATUS FOR MANUFACTURING CEMENT BOARDS.

1,204,083.

Specification of Letters Patent.

Patented Nov. 7, 1916.

Application filed January 25, 1915. Serial No. 4,118.

*To all whom it may concern:*

Be it known that I, ALDEN B. STARR, a citizen of the United States, residing at New York city, in the borough of Brooklyn and State of New York, have invented certain new and useful Improvements in Apparatus for Manufacturing Cement Boards, of which the following is a full, clear, and exact description.

This invention relates to the method and apparatus for the manufacture of boards of cementitious material, and the like. Boards of this character have been used for various purposes, and one of their principal adaptations has been in the manufacture of the so-called "asbestos shingle" which is composed of a mixture of cementitious material and asbestos fiber, and my invention aims to provide a method and means which is especially suitable for obtaining a large output of these boards or slabs at a low cost.

Another object of my invention is to provide a board or slab of varying thickness from edge to edge, so that cement shingles of the same shape as the tapered or wedge-shaped wooden shingles, may be produced.

In accordance with these objects, my invention consists broadly in mixing the cement and a suitable binder, such as asbestos fiber, and the like, with a suitable amount of liquid or water until it reaches the desired consistency and mobility and in pouring the substance while in liquid state in a suitable mold so as to form a layer of the material, and in then withdrawing from the layer, the greater portion of its liquid content by creating a difference of pressure on opposite faces of the layer, so that the sheet of the cementitious material is partially dried and sufficiently firm to permit it to be handled. The slabs or boards may then be subjected to hydraulic pressure in the usual manner to exclude from them the remaining liquid and may then be permitted to set and dry in the usual manner. In carrying out this process, my invention also contemplates the provision of a mold with a sloping bottom so that the liquid mass within the same, due to its mobility, will seek its own level and be distributed therein in a layer of varying thickness from which the water may then be excluded as before. By cutting the board in pieces of the proper width, the production of cement shingles thicker at the butt end may be carried on in an entirely simple and economical manner.

My invention also contemplates a machine for the manufacture of cement boards by which their production may be carried on continuously and in accordance with this object, the invention also consists of a machine having a movable mold, preferably an endless carrier, upon which the material is spread in the layer in liquid state, and in means for moving the mold carrying the layer of material over a vacuum chamber and other means for subjecting the faces of the layer to a difference in pressure so that the greater portion of its liquid content is withdrawn and the layer of material delivered from the machine in the partially dried state and sufficiently firm to permit it to be handled.

Other objects of the invention will be apparent from the detailed description hereinafter to follow, and will be particularly pointed out in the appended claims.

In the accompanying drawings, there is shown a machine by which the process may be carried out in a continuous manner, and in accordance with the preferred principles of the invention, in which:

Figure 1 shows a vertical section of the machine referred to; Fig. 2 is a transverse section through the machine to the front of the vacuum chamber; Fig. 3 is a detail of the feed hopper construction; and Fig. 4 is a detail of the endless carrier which forms the mold.

The machine consists of an endless carrier comprising a conveyer belt 1, carried by supporting rollers 2 and 3, respectively, one of which may be driven in any suitable manner as by a pulley 4. These rollers and pulley are supported in a suitable frame comprising standards or legs 5, which are connected by side braces or struts 6. The braces 6 carry transverse beams or supporting members upon which is positioned a flat plate 8, which, as is shown in Fig. 1, forms a supporting structure upon which the upper half of the conveyer belt rests, the direction of movement of the conveyer belt being indicated by the arrow. The conveyer belt in the preferred form of construction comprises a canvas belt 9 of fairly coarse weave to the outer face of which is sewed a strip of carpet 9', or other material, although this particular construction is not essential. Secured to the side edges of the belt are the metallic plates 10 having upstanding flanges 11, which, as is shown in Fig. 4, overlap each other and form a substantially water-tight joint between the abutting faces. The upper face of the belt, therefore, forms a trough or mold into which the plastic material may be poured and upon which it will spread out and form a layer of the desired thickness. This material is fed to the carrier by means of a hopper 12 carried by the frame of the machine. The mouth of this hopper is extended at right angles to the main portion of the hopper and is substantially the same length as the width of the belt between its side flanges, and is of a width sufficient to permit a layer of the desired thickness to be fed to the belt when the machine is in operation. The mouth is closed by means of a pivoted cover or slide 13 when the machine is not working.

Positioned adjacent the end of the machine opposite the hopper is a casing 14, which is bolted to the underface of the plate and forms therewith an air-tight chamber 14'. The face of the plate directly above this casing is perforated as at 15, and the air is exhausted from the chamber by means of an air pump 16. Directly above this chamber on each side of the frame are a plurality of rollers 17 which are resiliently mounted in spring bearings 18 carried on the frame. These rollers press against the face of the side plates 10 on the belt and in this manner force the belt into close contact with the contacting face of the supporting plate 8, so as to form a hermetic seal between these parts. Air is therefore permitted to enter the chamber 14' only through the perforations 15 therein. If a vacuum is produced in this chamber, the suction which is thus created by the different pressures on the faces of the layer of material will draw the water from the layer, through the perforations, into the chamber. This water may be exhausted from the chamber by means of a force-pump 19, which is necessary since the water would not otherwise flow from the vacuum chamber. If desired, a stand-pipe of about 30 feet in length may be substituted for this pump: i. e. one in which the weight of the column of water within the stand-pipe is sufficient to overcome the pressure against the lower open end of the pipe to permit the water to flow out of the bottom of the same. Extending from the rear end of the conveyer is a table 20 which is on a level with the face of the upper half of the conveyer belt so that the layer of material, after it is partially dried and sufficiently firm to permit it to retain its shape under its own weight, is discharged onto this table. The table is provided with two side flanges or guiding pieces 21, which prevent any lateral displacement of the layer or sheet. and arranged at any desired point upon the table is a reciprocating knife 22 which may be automatically actuated by means of the crank and connecting rod 23 and 24, respectively, which are driven by means of a pulley 25 geared to the main drive of the machine in any suitable manner, so that the board is automatically cut into strips of the proper widths to form shingles or slabs of any desired size.

Referring now to the construction by which the layer of cementitious material may be made of varying thickness at its respective edges, so that by cutting the board transversely, shingles of the proper width may be provided which taper in the manner similar to the wooden shingles which are ordinarily used, this feature of the invention is accomplished by making the legs 5 which support one side of the frame adjustable in height. This may be effected by making the legs in two parts and joining them by a pin and slot connection 26. The legs supporting the opposite side of the frame may be jointed as at 27 which will permit the frame to be tilted without throwing the rollers and their bearings out of line. By adjusting the legs in this manner, the plate and endless carrier which form the bottom of the mold may be tilted to any desired slope. The liquid material when poured into the same, will, therefore, seek its own level and the result will be a layer of material varying in thickness at its respective edges. Such a layer is shown in section in Fig. 2 of the drawing and designated 28. When this construction is used it is preferable to shape the mouth of the hopper so that the material is fed to the mold or endless carrier in such a manner that the layer will vary in thickness from edge to edge, which may be accomplished by making one end of the mouth wider than the other. (See Fig. 3).

The operation of the machine and the novel process is obvious from the description, but will now be briefly set forth.

The proper mixture of cement and binder, such as asbestos fiber, is mixed with water until a mixture of the desired consistency and mobility is obtained. This is poured into the hopper and the endless carrier or mold is started. The mouth of the hopper is then opened and since the mouth is in close proximity thereto, the liquid mass of material within the hopper will spread out over the belt as it passes the mouth of the hopper in a layer of the desired thickness. The flanges form with the belt a mold which shapes the layer to the desired width and thickness. As the material upon any portion of the mold approaches the vacuum chamber 14', the rolls 17 will press the same and form a hermetic seal between the contacting faces of the belt and plate adjacent their edges, and as a portion of the material in the mold passes over this chamber, the greater part of the liquid content is sucked therefrom, which is controlled by the vacuum maintained within the chamber, which vacuum may be varied by increasing or decreasing the capacity of the air-pump 16. A long narrow sheet of material is therefore delivered to the table 20 where it is cut into pieces of the proper width by the knife 22. A sufficient quantity of water is withdrawn from the layer by the suction to permit the same to be handled, and the pieces or flat strips thus obtained may then be carried to a hydraulic press and the remaining water excluded from them by the compression of the material in the usual manner. The pieces are permitted to dry and set in the usual manner. By cutting the sheet into relatively short pieces shingles may be produced.

Where the bottom of the mold is tilted, as shown in Fig. 2, shingles or other boards of varying thicknesses are provided, otherwise the process is the same, and in compressing these within the hydraulic press, they are placed with the butt ends of the alternate shingles or boards facing in opposite directions. In this manner, the shingles or boards may be compressed without disturbing the varying thickness of the same.

While I have shown one form of machine whereby the process may be carried on continuously, yet it is clear that, broadly speaking, the liquid content could be displaced from the layer of material in other ways than by suction and be within the purview of the invention as set out in the claims relating thereto. It is intended that the invention is sufficiently broad to cover any form of mold having a tilted base in which a liquid mass of material is poured and permitted to settle so that a sheet or layer of a varying thickness is produced and the liquid is thereafter removed from the layer by creating a difference in the air pressure on opposite faces of the layer.

I claim:

1. In a machine for manufacturing boards of cementitious material, an endless carrier constituting a mold, means for supporting said carrier with its face sloping transversely, means for feeding a liquid mass of the material to said mold, and means for displacing the liquid from said mass while in said mold.

2. In a machine for manufacturing boards of cementitious material, an endless carrier constituting a mold, means for supporting said carrier with its face sloping transversely, means for feeding a liquid mass of the material to said mold, and means for applying suction to said layer to withdraw the liquid from the mass.

3. In a machine for manufacturing boards of cementitious material, a perforated endless belt having side flanges constituting a mold, a supporting table for the upper half of said belt and an adjustable support for said table and belt for tilting said parts transversely of their length, means for feeding a constant stream of liquid material to said belt to form a layer thereon, and means for displacing the liquid content from said layer while said layer is in motion.

In witness whereof, I subscribe my signature, in the presence of two witnesses.

ALDEN B. STARR.

Witnesses:
 WALDO M. CHAPIN,
 JOSEPH A. BUCKLEY.